H. G. Eastman.
Arrangement of School Desks.
N° 44,082. Patented Sept. 6, 1864.
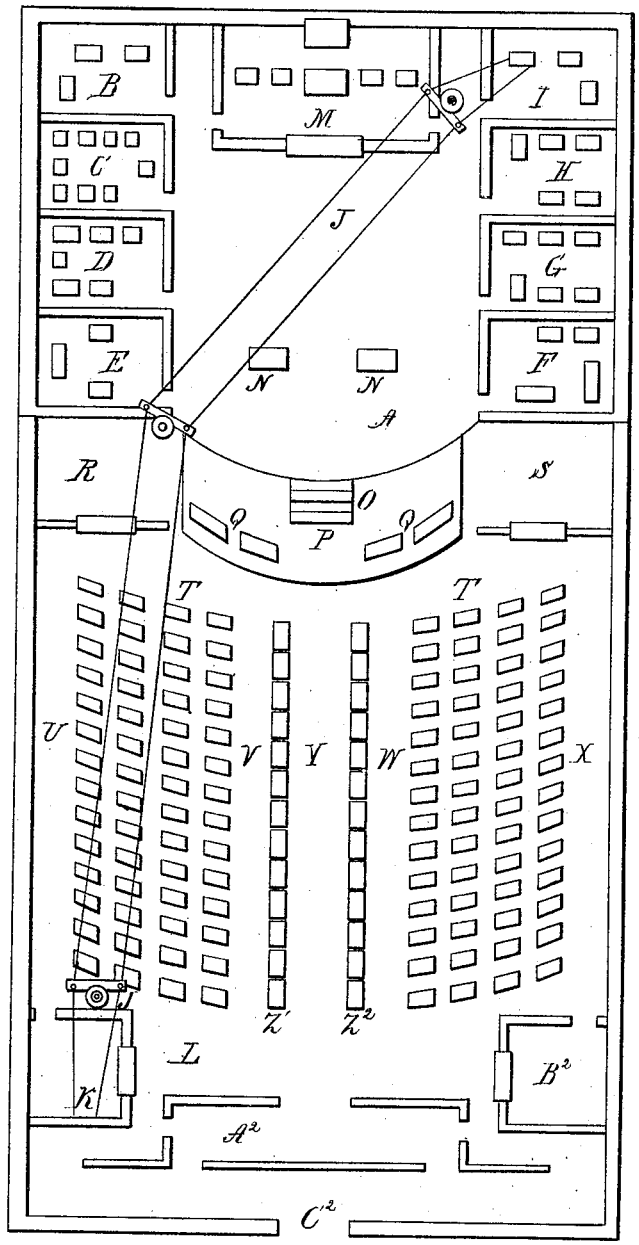
Witnesses
C. L. Barritt
Charles Barritt
Inventor
H. G. Eastman

UNITED STATES PATENT OFFICE.

H. G. EASTMAN, OF POUGHKEEPSIE, NEW YORK.

IMPROVEMENT IN THE ARRANGEMENT OF DESKS FOR SCHOOL-ROOMS.

Specification forming part of Letters Patent No. 44,082, dated September 6, 1864.

*To all whom it may concern:*

Be it known that I, H. G. EASTMAN, of Poughkeepsie, Dutchess county, State of New York, have invented or discovered a new and useful method of constructing and arranging the offices, desks, forms, &c., of school edifices for teaching the practical and theoretical operations of trade and commerce; and I do hereby declare the following to be a full description of the same.

The object of my invention is to teach youths all the various branches of trade and commerce by a thoroughly practical course of training. This I do by means of a new method of arranging and systematizing the school, so as to represent stores of various kinds of merchandise, freight and express agencies, importers and exporters' warehouses, auctioneers, real-estate agencies, exchange brokers, post-offices, lines of telegraphing with real instruments, and banks of discount and deposit, &c., each branch of trade having sample checks to represent the article dealt in, with appropriate bills, forms, receipts, vouchers, &c., and a school currency issued by the banks, based upon a substantial deposit of real money, redeemable by the student on closing up his business accounts, so as to make the entire course of training of the student have all the characteristics of a reality, the same as if pursued in real operations of trade and commerce; and the nature of my invention consists in the new method of arranging and combining the offices, desks, forms, and lines of telegraphing wires for the transmission of business correspondence with a commercial school or college room, so as to enable the pupil while acquiring his commercial education to conduct a substantial and real operation, and thus familiarize him with the management of more extensive business operations after graduating from the school; but, to describe my invention more particularly, I will refer to the accompanying drawings, forming a part of this specification, the same letters of reference wherever they occur referring to like parts.

Figure 1 is a plan view of the commercial college or school room.

Letter A represents a raised floor at the rear of the room, having at each side of it a row of four inclosed offices or rooms, of which B, having three desks, is the "mercantile agency;" C, having eight desks, is the "first national bank;" D, having six desks, is the "railroad and steamship office;" E, having three desks, the "insurance office;" F, having three desks, the "brokerage and exchange and collection office;" G, having six desks, the "express office;" H, having five desks, the "auction and commission office," and I, having three desks, the "telegraph office," representing the terminus of the line of telegraph J at Poughkeepsie, New York, the other terminus K being located at the opposite extreme end of the sub-department L of the building or school, representing any foreign point or place of business.

Between the two rows of rooms or offices on the raised floor and at the rear of the room is the general "banking office," M, having six desks and safes and places of deposit for securities in it.

Letters N N are two desks in front of the banking office M, and between the rows of offices for the preceptors and assistant preceptors, who are thus conspicuously before the whole class, to be referred to by the pupils in all matters relating to the customs and practices of trade and commerce. Approaching the raised floor is a series of steps, O, which start from a lower raised platform, P, on which, at each side of the steps, are two desks, Q Q, for the "officers of the school." On each side of the lower raised platform is the "custom-house" R and the "dry-goods emporium" S. In front of these offices and extending down the sub-department toward the entrance of the school are a series of desks, T, arranged in parallel rows, as "desks for students operating as retail merchants." At the sides of these desks are streets U, V, W, and X, designated as "Commercial street," "Stevens avenue," "Eastman's avenue," and "Washington street," for the purpose of facilitating the business operations of the student in occupying these stores or desks. Down the middle of the room is a "Broadway," Y, on each side of which is a row of stores or desks, $Z'$ $Z^2$, which are occupied by students operating as "forwarding and commission merchants" and "importers and jobbers of goods." In front of the ends of these desks is the exchange $A^2$, and at the right-hand side of the school, in front of the desks for the retail traders, is the "post-office" $B^2$, and $C^2$ is the passage-way leading from the doorway to the entrance of the school.

It will be obvious from this arrangement of the school that my system of teaching a practical as well as a theoretical commercial education is not only consistent with the laws of trade, but at the same time stimulating in the highest degree the pride and ambition of the pupil to acquire a perfect knowledge of all the various branches of trade. By this means the latent talent of the pupil is developed, and he is thereby enabled when he graduates from the college to select that branch of trade most congenial to his taste and in which he will be most likely to be useful to himself and his employers.

Having now described my new method of constructing and arranging the offices, desks, banks, and telegraphs, &c., of schools and colleges for teaching a commercial education, I will proceed to set forth what I claim and desire to secure by Letters Patent of the United States.

I claim as my invention—

The new method of constructing and arranging the offices, desks, banks, and lines of telegraphs, &c., as described, in combination with the school or college room, as hereinbefore set forth.

H. G. EASTMAN.

Witnesses:
C. L. BARRITT,
CHARLES BARRITT.